United States Patent
Kuchibhatla et al.

(10) Patent No.: US 8,876,197 B1
(45) Date of Patent: Nov. 4, 2014

(54) INSTRUMENT PANEL TO BODY COWL ATTACHMENT WITH PEDESTRIAN PROTECTION

(71) Applicant: Ford Global Technologies, LLC, Dearborn, MI (US)

(72) Inventors: Sreenivas Kuchibhatla, Canton, MI (US); Jeffrey P. Webb, Iron Mountain, MI (US); Richard L. Routson, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/028,849

(22) Filed: Sep. 17, 2013

(51) Int. Cl.
*B60R 21/34* (2011.01)
*B62D 25/08* (2006.01)
*B62D 25/14* (2006.01)

(52) U.S. Cl.
CPC .............. *B60R 21/34* (2013.01); *B62D 25/081* (2013.01); *B62D 25/14* (2013.01)
USPC ........ 296/192; 296/1.04; 296/72; 296/187.04

(58) Field of Classification Search
CPC ............ B60R 21/34; B60R 2011/0005; B60R 2021/003; B62D 25/08; B62D 25/081; B62D 25/082; B62D 25/14; B62D 27/06
USPC .......... 296/1.04, 70, 72, 187.04, 187.09, 192, 296/193.01, 193.03
See application file for complete search history.

(56) References Cited

U.S. PATENT DOCUMENTS

| | | | |
|---|---|---|---|
| 2,818,933 A * | 1/1958 | Tell ................................ | 180/90 |
| 4,887,861 A | 12/1989 | Moch et al. | |
| 6,193,305 B1 * | 2/2001 | Takahashi ..................... | 296/192 |
| 6,802,559 B2 | 10/2004 | Yoshihara et al. | |
| 2002/0014788 A1 * | 2/2002 | Fujita et al. ................... | 296/192 |
| 2005/0110302 A1 | 5/2005 | Riha et al. | |
| 2006/0226681 A1 | 10/2006 | Kelly | |
| 2006/0283643 A1 | 12/2006 | Simonds et al. | |
| 2013/0057026 A1 | 3/2013 | Kim et al. | |
| 2013/0134736 A1 | 5/2013 | Kuwabara et al. | |

FOREIGN PATENT DOCUMENTS

DE 102011087739 A1 6/2013

* cited by examiner

*Primary Examiner* — Glenn Dayoan
*Assistant Examiner* — Jason S Daniels
(74) *Attorney, Agent, or Firm* — Vichit Chea; MacMillan, Sobanski & Todd, LLC

(57) ABSTRACT

A road vehicle has an instrument panel substrate supported by a sheet metal body cowl. The body cowl is configured to be supported by a firewall of the vehicle. A fastener joins the instrument panel substrate and the body cowl comprising a magnetic member mechanically affixed to one of the instrument panel substrate or the body cowl at a predetermined location. The magnetic member attaches with a substantially horizontal magnetic surface of the other one of the instrument panel substrate or the body cowl. The magnetic member vertically separates from the magnetic surface in response to an impact force applied against the body cowl that is greater than a predetermined force. Furthermore, the magnetic attachment of the magnetic member to the magnetic surface prevents separation below the predetermined force. Thus, the conflicting demands of squeak and rattle performance versus pedestrian protection are easily satisfied.

9 Claims, 4 Drawing Sheets

INSTRUMENT PANEL TO BODY COWL ATTACHMENT WITH PEDESTRIAN PROTECTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to the mounting of an instrument panel to a body cowl in a road vehicle.

A typical portion of the front end structure in cars, trucks, and other road vehicles which is at the interface between a passenger compartment and an engine compartment comprises a sheet metal body cowl set atop the firewall which supports a windshield and a front, upper section of an instrument panel substrate. The instrument panel substrate carries various elements such as driver instrumentation, climate control components, entertainment components, storage compartments, and airbag devices. Besides being supported at its top, front end by the body cowl, the instrument panel substrate is also supported at its middle and bottom sections by other body structures such as a cross-car beam.

An important consideration in designing a vehicle is the control of noise, vibration, and harshness (NVH). To help maintain good NVH performance, steel attachment brackets between the instrument panel substrate and body cowl act as spacers so that the instrument panel substrate can flex without significant interaction with the body cowl. By appropriately designing the steel brackets, target NVH levels can be achieved for each particular vehicle model. Generally, stiffness must be high in order to achieve a high NVH performance.

Very stiff brackets, however, may be undesirable from the standpoint of achieving a desired pedestrian protection. In an accidental impact between a vehicle and a pedestrian, stiffer surfaces at the vehicle's exterior can result in an undesirably high acceleration being applied to the impacting pedestrian. A structure which is more yielding (i.e., compliant) tends to produce lower injury by reducing the reaction forces seen by the impactor.

It is desirable for the body cowl to deflect downward in response to an impact against the hood or windshield. An overly stiff connection between the body cowl and the instrument panel substrate results in the instrument panel lowering the ability of the body cowl to deflect downward. Significant effort is required to determine a configuration of the steel brackets that achieves the conflicting demands of NVH and pedestrian protection. Thus, the known attachment system using steel brackets results in large inefficiencies in the design process, which is especially severe in an organization that designs vehicles for many vehicle model programs.

SUMMARY OF THE INVENTION

In one aspect of the invention, apparatus is provided for a road vehicle comprising an instrument panel substrate supported by a body cowl. The body cowl is configured to be supported by a firewall of the vehicle and it is comprised of sheet metal. A fastener joins the instrument panel substrate and the body cowl comprising a magnetic member mechanically affixed to one of the instrument panel substrate or the body cowl at a predetermined location. The magnetic member attaches with a substantially horizontal magnetic surface of the other one of the instrument panel substrate or the body cowl. The magnetic member vertically separates from the magnetic surface in response to an impact force applied against the body cowl that is greater than a predetermined force. Furthermore, the magnetic attachment of the magnetic member to the magnetic surface prevents separation below the predetermined force.

DETAILED DESCRIPTION OF PREFERRED EMBODIMENTS

The present invention places a magnet between the steel bracket and the body cowl sheet metal (instead of the steel bolts) in order to complete the attachment. Preferably, the magnet is fastened to the steel bracket at the end remote from the instrument panel substrate, and then maintains a holding force to the body cowl sheet metal.

This attachment system more easily achieves the engineering objectives to be accomplished at this interface. The joint can be stiff enough to maintain high NVH performance, while still being compliant enough to meet pedestrian protection (Pedpro) requirements. This dual objective can be achieved by tuning and designing the force of the magnet accordingly. Under typical NVH conditions, the forces observed on the magnet are at low levels and are linear in nature. During a Pedpro event, the force experienced by the magnet is higher and nonlinear. For example, in typical NVH conditions for a particular vehicle, the magnets may experience only about 50 N of force. During a Pedpro event, the force magnitude may be around 750 N for this hypothetical vehicle. In this case, the magnetic attachment would be designed to withstand a force level of 750 N after which it would break contact between the bracket and the cowl sheet metal by separating. The magnet remains fastened to the steel bracket after separation. Physical testing and virtual simulations can easily be used for determining the exact magnitude of the magnet forces for different vehicle models/designs with minimal time and effort compared to the prior art efforts for determining a suitable bracket design on a case by case basis.

Figure 1:
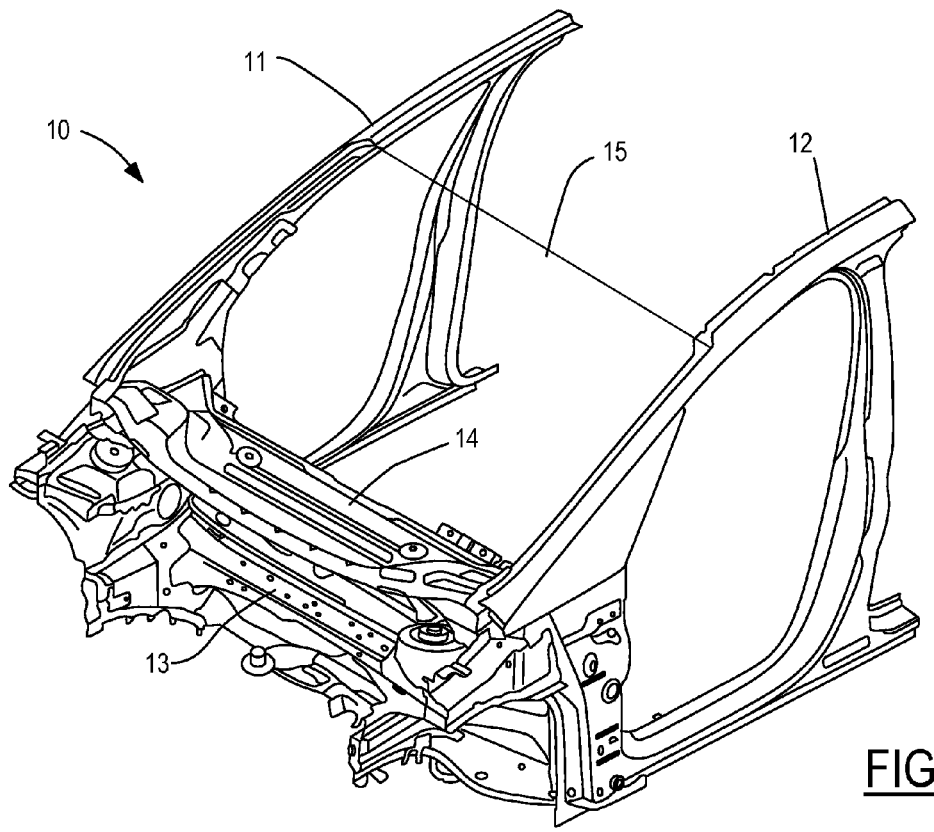
FIG. 1 is a perspective view of a vehicle body front end.
Figure 2:
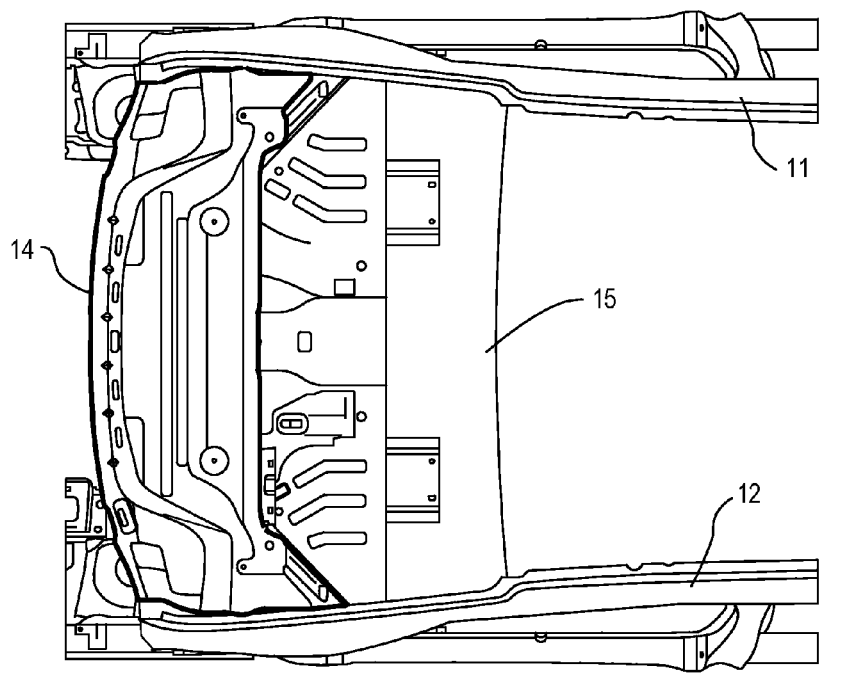
FIG. 2 is a top view of the vehicle body front end of FIG. 1.

Referring now to FIGS. 1 and 2, vehicle body structure 10 includes right and left side sheet metal panels 11 and 12. Extending between side panels 11 and 12 are a firewall 13 and a body cowl 14. A windshield 15 is supported by side panels 11 and 12 and by body cowl 14. Body cowl 14 is attached to firewall 13 and side panels 11 and 12 by welding or by mechanical fasteners such as bolts, for example.

In the typical construction, an instrument panel substrate is designed to hold various interior accessories and includes a top portion which overlies the body cowl. The overlying portion is connected to and supported by the body cowl to provide a passenger compartment with sufficient structural integrity. Due to the proximity of the substrate-to-cowl connections, NVH performance of the interface becomes important.

Figure 3:
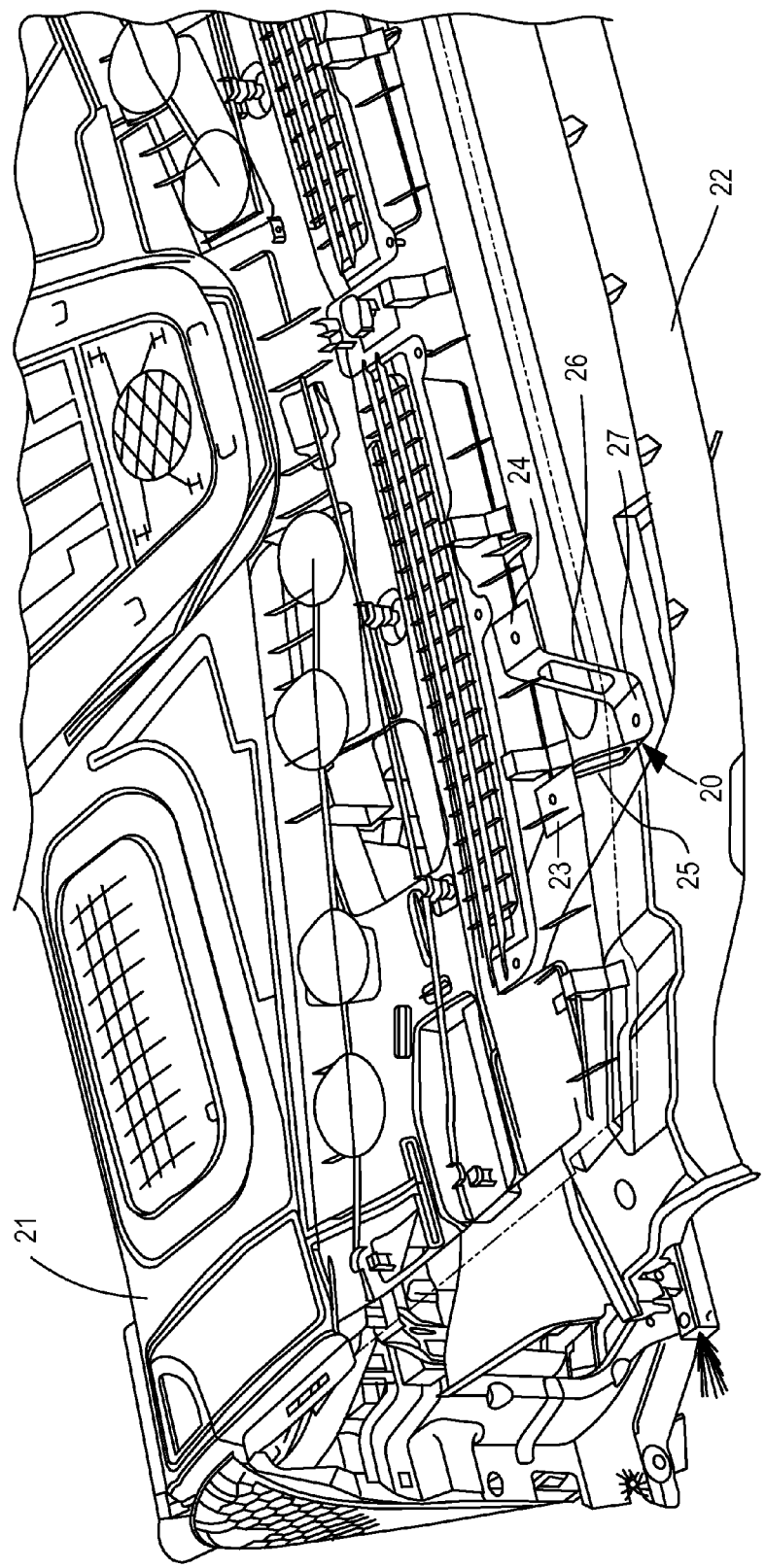
FIG. 3 is a perspective view showing a prior art fastening of an instrument panel to a body cowl.

FIG. 3 shows a prior art system employing a bracket 20 configured to be bolted onto an instrument panel substrate 21 and onto a body cowl 22. Bracket 20 is formed of steel (e.g., by stamping) and has a pair of feet 23 and 24 containing respective bolt holes for being bolted onto instrument panel substrate 21. A pair of arms 25 and 26 extends to a mounting plate 27 having a bolt hole for attaching bracket 20 to body cowl 22. To achieve the necessary amount of stiffness for NVH performance and a sufficient amount of compliance for pedpro performance, significant effort has been required to configure the shape and thickness of the various features on bracket 20.

Figure 4:
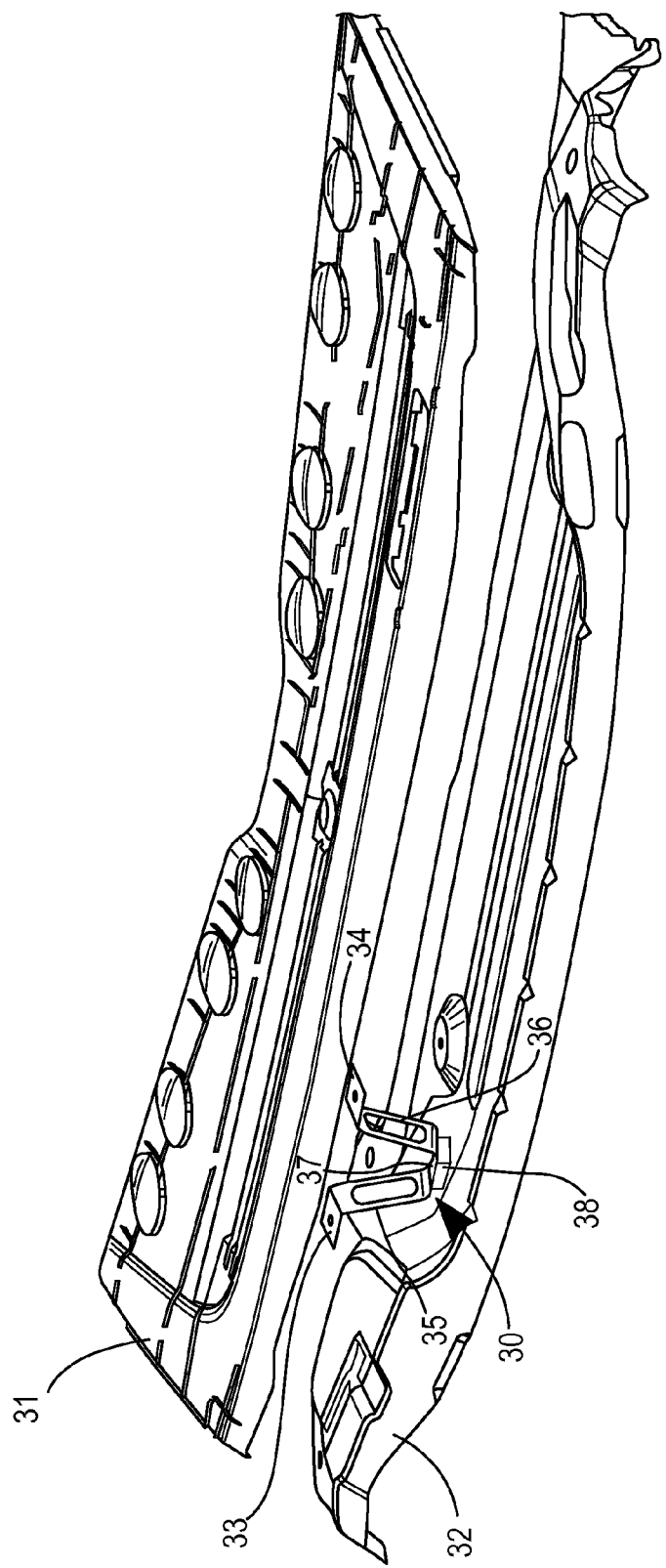
FIG. 4 is a perspective view showing an instrument panel, bracket, and body cowl that are fastened in the manner of the invention.

FIG. 4 shows an improved apparatus according to one embodiment of the present invention for fastening an upper, forward edge of an instrument panel substrate 31 to a body cowl 32 via a fastener 30. Fastener 30 is a bracket with a pair of feet 33 and 34 adapted to be mechanically affixed (e.g., bolted) to instrument panel substrate 31. A pair of arms 35 and 36 extend to a mounting plate 37 carrying a magnetic member 38 by mechanical attachment (e.g., by bolting or adhesives). Body cowl 32 is comprised of sheet metal which is magnetically permeable. Body cowl 32 may typically be magnetically permeable across its full extent, but it is sufficient if it is magnetically permeable at at least a horizontal magnetic surface where magnet member 38 comes into contact with body cowl 32.

In an alternative embodiment, the magnetic member can instead be placed between a bracket and a magnetizable section of the instrument panel substrate (i.e., with the bracket being mechanically affixed to the body cowl). In other embodiments, the bracket can be eliminated and the magnet member mechanically attached directly to the instrument panel substrate (in such a case, however, the magnet member and instrument panel substrate structure to which it is attached must be able to provide sufficient stiffness to obtain the desired NVH performance).

Figure 5:
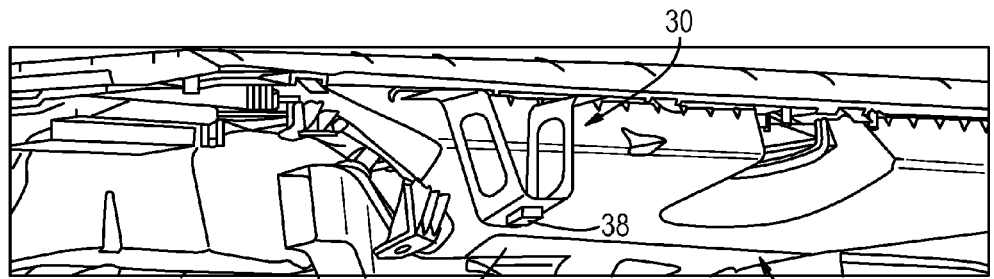
FIG. 5 is a bottom, perspective view showing the bracket attached to the instrument panel of FIG. 4.

FIG. 5 is a bottom, perspective view. Magnet member 38 is shown in proximity to a horizontal magnetic surface 40 on body cowl 32 for receiving magnet member 38. Magnetic member 38 and magnetic surface 40 are arranged to allow vertical separation in response to an impact force being applied against body cowl 32 that is greater than a predetermined force. The predetermined force is enough to overcome the magnetic attraction generated when magnet member 38 is in contact with magnetic surface 40. When vertical forces applied to the body cowl or instrument panel substrate are below the predetermined force, then vertical separation is prevented by the magnetic attraction.

Figure 6:
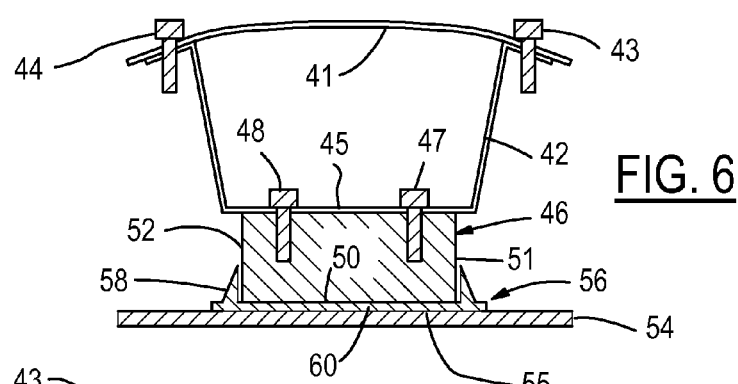
FIG. 6 is a side, cross-sectional view showing an alternative embodiment of the invention in greater detail.
Figure 7:
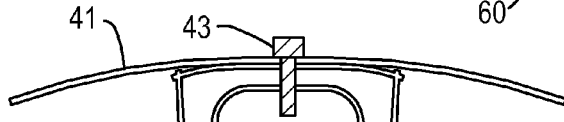
FIG. 7 is a side, cross-sectional view transverse to the view of FIG. 6.
Figure 7:
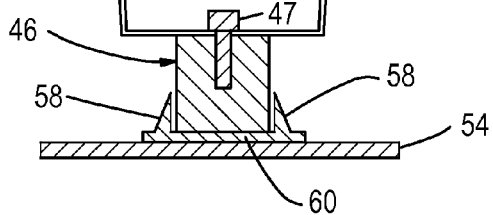

Another embodiment of the invention is shown in greater detail in FIGS. 6 and 7. An instrument panel 41 has a steel bracket 42 attached by a pair of bolts 43 and 44. A mounting plate 45 of bracket 42 is affixed to a magnet member 46 by bolts 47 and 48. Magnet member 46 is preferably comprised of a permanent magnet body having a horizontal face 50 along its bottom side. Magnet member 46 is preferably box-shaped with vertical side surfaces 51 and 52. Magnet member 46 is designed with a magnetic force magnitude that provides a desired holding force against a body cowl sheet metal member 54 at a horizontal magnetic surface 55 adapted to mate with magnet face 50. In order to properly align magnet member 46 at the desired location on body cowl 54, a plastic guide member 56 may be provided on body cowl 54. At each lateral side of guide member 56, an upstanding barrier wall is placed in order to constrain lateral movement of magnet member 46.

In order to reduce any potential squeak and rattle or any other NVH concerns, guide body 56 may also include a liner section 60 to be arranged between magnet member 50 and horizontal magnetic surface 55. Liner section 60 is thin enough to avoid any substantial reduction in the magnetic forces, but thick enough to provide cushioning and reduction of noises resulting from lateral movement of magnet member 46. Guide member 56 may be attached to body cowl 54 by any convenient method, such as adhesives or mechanical fasteners.

Figure 8:
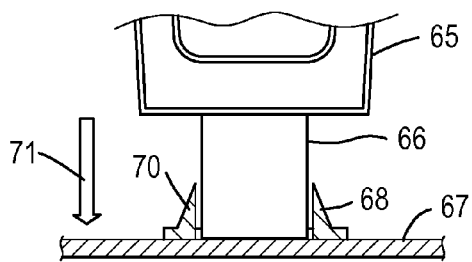
FIGS. 8 and 9 illustrate the application of vertical force on the fastener and the separation of the fastener during a pedestrian impact.
Figure 9:
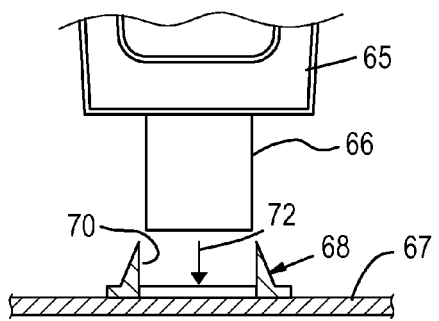

FIGS. 8 and 9 show yet another embodiment of the invention wherein a steel bracket 65 connected to an instrument panel substrate carries a magnet member 66. A body cowl 67 carries a guide member 68 which may be shaped as ring with a square or rectangular center opening. Guide member 68 provides an outer barrier wall 70 for constraining lateral movement of magnet member 66 along body cowl 67. In order to reduce squeak and rattle, magnet member 66 may carry a plastic liner or may be coated in a resilient material.

FIGS. 8 and 9 illustrate a separation of the fastener in response to a vertical impact force 71 that is transmitted to body cowl 67 (e.g., as a result of a collision with an impactor). When the vertical impact force has a magnitude greater than a predetermined force, then separation occurs as shown by arrow 72 in FIG. 9 by downward movement of body cowl 67. The separation limits the acceleration that can be imparted to the impactor.

According to the predetermined location where the magnetic fastener is placed and upon the magnetic holding force generated by the strength of the permanent magnet and the separation between the permanent magnet and the magnetically permeable surface to which it holds, the invention achieves a stiffness in response to non-impact forces which obtains excellent NVH performance while ensuring the desired pedestrian protection performance when an impact does occur.

What is claimed is:

1. Apparatus for a road vehicle comprising:
   an instrument panel substrate;
   a body cowl configured to be supported by a firewall of the vehicle and to support the instrument panel substrate, wherein the body cowl is comprised of sheet metal; and
   a fastener joining the instrument panel substrate and the body cowl comprising a magnetic member mechanically affixed to one of the instrument panel substrate or the body cowl at a predetermined location so that the magnetic member attaches with a substantially horizontal magnetic surface of the other one of the instrument panel substrate or the body cowl, wherein the magnetic member vertically separates from the magnetic surface in response to an impact force applied against the body cowl that is greater than a predetermined force, and wherein the magnetic attachment of the magnetic member to the magnetic surface prevents separation below the predetermined force.

2. The apparatus of claim 1 further comprising:
   a steel bracket extending downward from the instrument panel substrate;
   wherein the magnetic member is bolted to the steel bracket.

3. The apparatus of claim 1 further comprising:
horizontal stops adjacent to the horizontal magnetic surface to prevent horizontal movement of the magnetic member with respect to the horizontal magnetic surface.

4. The apparatus of claim 3 wherein the horizontal stops are comprised of a plastic barrier wall attached to the body cowl.

5. The apparatus of claim 1 further comprising a liner disposed between the magnetic member and the horizontal magnetic surface to reduce squeak and rattle.

6. The apparatus of claim 5 wherein the liner is comprised of a plastic sheet attached to one of the magnetic member or the horizontal magnetic surface.

7. The apparatus of claim 5 further comprising horizontal stops adjacent to the horizontal magnetic surface to prevent horizontal movement of the magnetic member with respect to the horizontal magnetic surface, wherein the horizontal stops are integrally formed with the liner.

8. The apparatus of claim 1 wherein the magnetic member is comprised of a permanent magnet affixed to the instrument panel substrate, wherein the body cowl is comprised of sheet metal, and wherein the magnet surface is comprised of a magnetically permeable portion of the body cowl.

9. A vehicle comprising:
an instrument panel substrate;
a sheet metal body cowl; and
a fastener comprising a magnetic member mechanically attached to one of the substrate and cowl and magnetically attached to a substantially horizontal surface of the other one of the substrate and cowl to vertically separate only in response to a vertical impact force greater than a predetermined force and constrained against horizontal movement.

* * * * *